(12) United States Patent
Hwang et al.

(10) Patent No.: US 9,074,655 B2
(45) Date of Patent: Jul. 7, 2015

(54) APPARATUS FOR DAMPING FLYWHEEL

(71) Applicant: Hyundai Motor Company, Seoul (KR)

(72) Inventors: Jae Woong Hwang, Yongin-si (KR); Yong Wook Jin, Suwon-si (KR); Wan Soo Oh, Yongin-si (KR); Seok Young Shin, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 301 days.

(21) Appl. No.: 13/689,365

(22) Filed: Nov. 29, 2012

(65) Prior Publication Data

US 2014/0045646 A1  Feb. 13, 2014

(30) Foreign Application Priority Data

Aug. 9, 2012 (KR) .......... 10-2012-0087322

(51) Int. Cl.
*F16F 15/30* (2006.01)

(52) U.S. Cl.
CPC ............. *F16F 15/30* (2013.01); *Y10T 74/2128* (2015.01)

(58) Field of Classification Search
CPC ..... F16F 15/30; F16F 15/315; F16F 15/3153; F16F 15/32; F16F 15/322

USPC ......... 475/267, 346, 347; 192/3.52; 74/574.2, 74/574.4
See application file for complete search history.

(56) References Cited

U.S. PATENT DOCUMENTS

| 5,551,928 | A | * | 9/1996 | Sudau | .......................... 475/347 |
| 5,836,217 | A | * | 11/1998 | Sudau et al. | ................. 74/574.4 |
| 5,863,274 | A | * | 1/1999 | Jackel | ............................ 475/347 |
| 6,106,430 | A | * | 8/2000 | Peinemann | ................... 475/346 |
| 6,408,717 | B1 | * | 6/2002 | Young et al. | ................. 74/433.5 |
| 8,523,732 | B2 | * | 9/2013 | Le Moal | ....................... 475/347 |
| 8,840,516 | B2 | * | 9/2014 | Murata | ........................ 475/267 |
| 8,919,317 | B2 | * | 12/2014 | Hwang et al. | .............. 123/192.1 |
| 2013/0109528 | A1 | * | 5/2013 | Hwang et al. | ................. 475/331 |
| 2013/0118849 | A1 | * | 5/2013 | Hwang et al. | ................ 192/3.52 |
| 2013/0255618 | A1 | * | 10/2013 | Hwang et al. | .............. 123/192.1 |
| 2013/0260953 | A1 | * | 10/2013 | Hwang et al. | ................. 475/347 |

* cited by examiner

*Primary Examiner* — Jacob S Scott
(74) *Attorney, Agent, or Firm* — Morgan, Lewis & Bockius LLP

(57) ABSTRACT

An apparatus for damping a flywheel includes a drive plate integrally connected to a crankshaft. A flywheel is connected to receive a rotating force from the drive plate through planetary gearing, and is mounted to rotate relative to the crankshaft. A rigidity imparting means is disposed on a path along which a rotating force is transferred between the drive plate and the flywheel. A mass body is provided on the flywheel, and is configured to perform relative rotation in a direction that offsets a torsional vibration of an engine transmitted to the flywheel.

8 Claims, 8 Drawing Sheets

APPARATUS FOR DAMPING FLYWHEEL

CROSS-REFERENCE TO RELATED APPLICATION

The present application claims priority of Korean Patent Application Number 10-2012-0087322 filed Aug. 9, 2012, the entire contents of which application is incorporated herein for all purposes by this reference.

BACKGROUND OF INVENTION

1. Field of Invention

The present invention relates, in general, to an apparatus for damping a flywheel and, more particularly, to a flywheel damping apparatus, intended to improve noise, vibration and harshness (NVH) characteristics of an engine and vehicle drivetrain through a change in rigidity as well as the inertia of a flywheel.

2. Description of Related Art

Generally, the driving force is always unbalanced by the change in gas pressure of a piston in an internal combustion engine, thus generating a torsional exciting force in the engine. Thus, it is preferable for the transmission of the power of the engine to be as constant as possible while the engine is rotating.

In order to improve the NVH characteristics of a drivetrain, the flywheel serves to keep the rotating speed constant using inertia moment, and to lower the change in frequency of torsional vibrations transmitted from the engine, thus decreasing the NVH problem (driving, idle rattle, etc.) in the drivetrain.

Meanwhile, in recent years, the development and release of vehicles equipped with high-performance engines (to which a GDI, a turbocharger, a supercharger, a twin turbo, etc. has been applied) has become competitive. Particularly, in order to solve the problem of a luxury vehicle lacking in a starting feel (direct feel), a high torque engine is intended to be used in a low speed region.

However, as shown in FIG. 1, such an engine is problematic in that the NVH characteristics including rattles and booming noise are deteriorated, as the torsional exciting force of the engine is further increased. Particularly, as torsional vibrations increase in gear pairs of a gear step in a gearbox, shock and noise are further increased by the rattles.

In the prior art solutions to the above problems, as shown in FIG. 2, a mass body is mounted to a dual mass flywheel to perform relative rotation.

To be more specific, pairing mass bodies 20 are provided on a plurality of positions on both sides of a rotary flange 10, and each mass body 20 rotates relative to the rotary flange 10. Further, a locking pin 30 passes through the rotary flange 10, and the mass bodies 20 are secured, respectively, on both sides of the locking pin 30, so that the mass bodies 20 provided on both sides simultaneously rotate relative to the rotary flange 10.

Further, a pendulum hole H is formed in a lengthwise direction, in the direction in which the rotary flange 10 rotates, in at least one of the rotary flange 10 and the mass bodies 20 provided on both sides thereof and, and a pendulum roller 40 coupled to the rotary flange 10 is fitted into the pendulum hole H. As the mass body 20 performs relative rotation in a section of the pendulum hole H, the torsional vibrations transmitted from the engine are reduced.

However, considering only the rotational vibrations and the NVH characteristics of the vehicle drivetrain, the larger the inertial force of the flywheel is, the more advantageous they are. The inertial force of the flywheel tends to increase as a function of the weight and volume thereof, so that the size and weight of the flywheel should be increased if possible. However, the conventional mass-body installing structure is problematic in that, due to the lack of space, the inertia of the mass body, the length of the flywheel and of the mass body, and the distance from the center of the mass body to the axis of rotation of the flywheel, etc. are restricted, so that the possible increase in the vibration reducing effect that can be achieved using the conventional structure is limited.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art Various aspects of the present invention provide for an apparatus for damping a flywheel, which occupies a relatively small volume and weight, allows the inertial force of the flywheel of an engine to be significantly increased, and enables the adjustment of rigidity between a crankshaft and the flywheel, thus significantly improving the NVH performance of a drivetrain of a vehicle, in addition to reducing the rotational vibrations that occur in the engine, and thereby securing silent and stable drivability of the vehicle and a comfortable ride.

Various aspects of the present invention provide for an apparatus for damping a flywheel, including a drive plate integrally connected to a crankshaft; a flywheel connected to receive a rotating force from the drive plate through planetary gearing, the flywheel mounted to rotate relative to the crankshaft; a rigidity imparting means disposed on a path along which a rotating force is transferred between the drive plate and the flywheel; and a mass body provided on the flywheel, the mass body configured to perform relative rotation in a direction that offsets a torsional vibration of an engine transmitted to the flywheel.

The planetary gearing may include three rotary elements, that is, a first rotary element connected to the drive plate, a second rotary element connected to the flywheel, and a rotary element adapted to constrain rotation, so that the second rotary element connected to the flywheel may be connected to increase a speed relative to the first rotary element connected to the drive plate.

The rigidity imparting means may include an elastic member disposed to elastically extend or contract with respect to relative rotation between two rotary bodies that are mounted to rotate relative to each other.

The rigidity imparting means may further include a support portion provided on each of the two rotary bodies to support both ends of the elastic member.

The apparatus may further include a guide bearing receiving an elastic force from the elastic member, the guide bearing provided between the two rotary bodies that are mounted to rotate relative to each other to guide the relative rotation between the two rotary bodies.

The planetary gearing may be provided such that a carrier is connected to the drive plate, a ring gear is connected to the flywheel, and rotation of a sun gear is constrained, and the rigidity imparting means may be provided between the drive plate and the carrier.

The planetary gearing may be provided such that a carrier is connected to the drive plate, a ring gear is connected to the flywheel, and rotation of a sun gear is constrained, and the rigidity imparting means may be provided between the ring gear and the flywheel.

The planetary gearing may be provided such that a carrier is connected to the drive plate, a ring gear is connected to the flywheel, and rotation of a sun gear is constrained, and the rigidity imparting means may be provided, respectively, between the drive plate and the carrier and between the ring gear and the flywheel.

The planetary gearing may be provided such that a carrier is connected to the drive plate, a sun gear is connected to the flywheel, and rotation of a ring gear is constrained, and the rigidity imparting means may be provided between the drive plate and the carrier.

The planetary gearing may be provided such that a carrier is connected to the drive plate, a sun gear is connected to the flywheel, and rotation of a ring gear is constrained, and the rigidity imparting means may be provided between the sun gear and the flywheel.

The planetary gearing may be provided such that a carrier is connected to the drive plate, a sun gear is connected to the flywheel, and rotation of a ring gear is constrained, and the rigidity imparting means may be provided, respectively, between the drive plate and the carrier and between the sun gear and the flywheel.

A pendulum hole may be formed in the mass body and the flywheel in such a way as to extend in a direction in which the mass body performs relative rotation, and a pendulum roller may be movably fitted into the pendulum hole, so that the mass body may be coupled to rotate relative to the flywheel.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
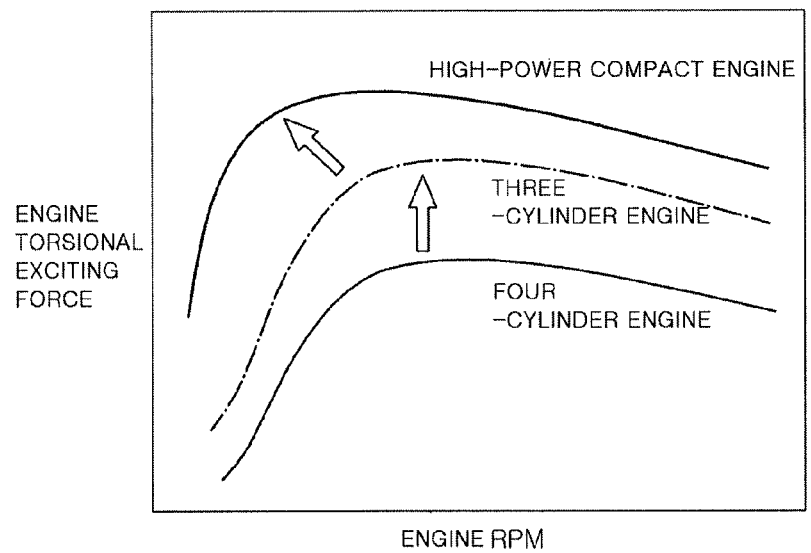
FIG. 1 is a view showing a torsional exciting force that varies as the high power of an engine is applied.
Figure 2:
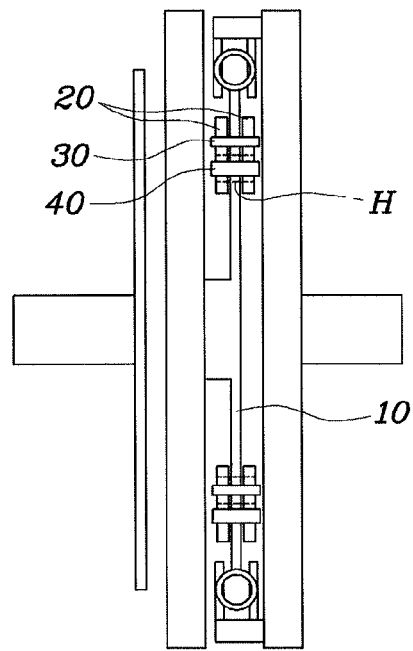
FIG. 2 is a view showing a conventional configuration wherein a mass body is mounted to a dual mass flywheel.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 to 8, a flywheel damping apparatus of the present invention includes a drive plate 3, a flywheel 5, a rigidity imparting means 7, and a mass body 21. The drive plate 3 is integrally connected to a crankshaft 1. One will appreciate that the drive plate may be monolithically formed with the crankshaft. The flywheel 5 is connected to receive a rotating force from the drive plate 3 through planetary gearing PG, and is mounted so that it rotates relative to the crankshaft 1. The rigidity imparting means 7 is disposed on a rotating-force transfer path between the drive plate 3 and the flywheel 5. The mass body 21 is provided on the flywheel 5, and is configured to perform relative rotation in a direction that offsets the torsional vibrations of an engine transmitted to the flywheel 5.

In other words, the flywheel damping apparatus is configured so that rotating force is transmitted from the crankshaft 1 to the flywheel 5 while being multiplied by the planetary gearing PG. Thereby, the flywheel 5 can provide increased inertia to the crankshaft 1, and the rigidity imparting means 7 disposed on a rotating-force transfer path between the drive plate 3 and the flywheel 5 can impart rigidity between the crankshaft 1 and the flywheel 5 such that the rigidity is optimized for the sake of the NVH performance of the engine and a vehicle drivetrain.

In particular, as the rotating speed of the flywheel 5 increases, the inertia of the flywheel 5 increases, so that rotating speed and inertia of the mass body 21 mounted to the flywheel 5 also increase. Consequently, the operation of offsetting the torsional vibrations of the engine can be more effectively achieved by the mass body 21.

The planetary gearing PG includes three rotary elements, that is, a rotary element connected to the drive plate 3, a rotary element connected to the flywheel 5, and a rotary element adapted to constrain rotation. The rotary element connected to the flywheel 5 is connected to increase the speed relative to the rotary element connected to the drive plate 3.

Figure 3:
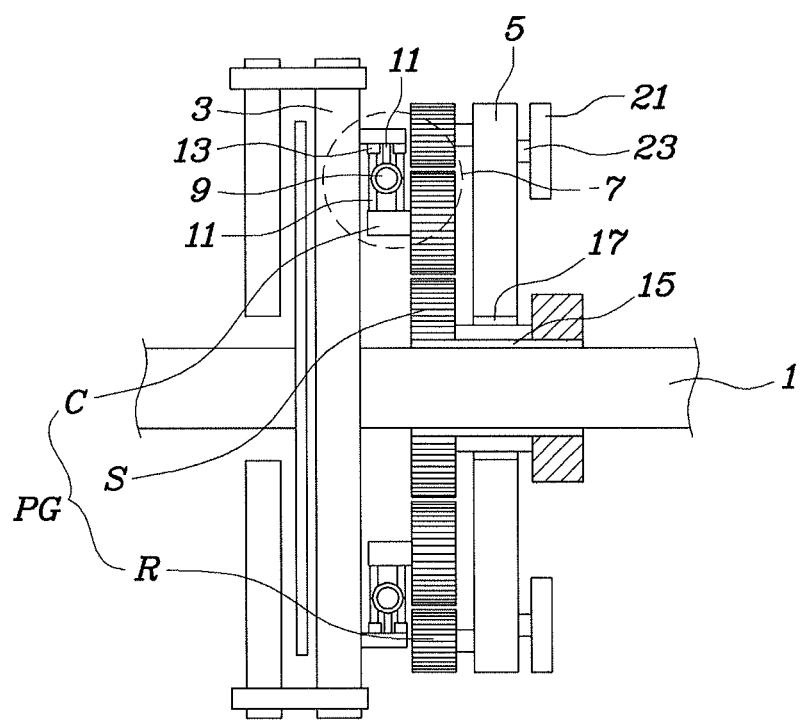
FIG. 3 is a view showing an exemplary apparatus for damping a flywheel according to the present invention.
Figure 4:
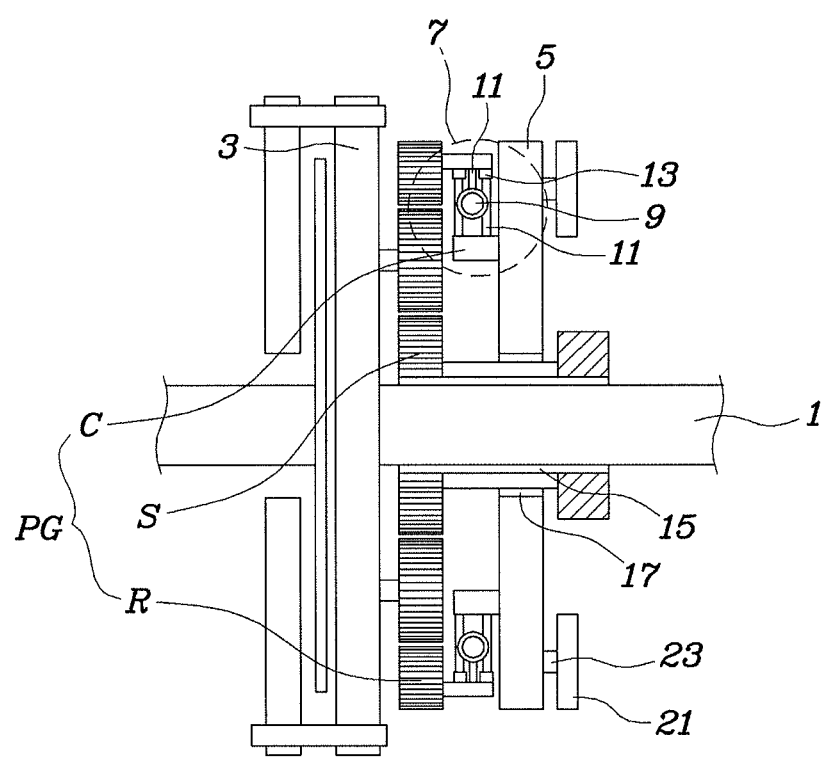
FIG. 4 is a view showing an exemplary apparatus for damping a flywheel according to the present invention.
Figure 5:
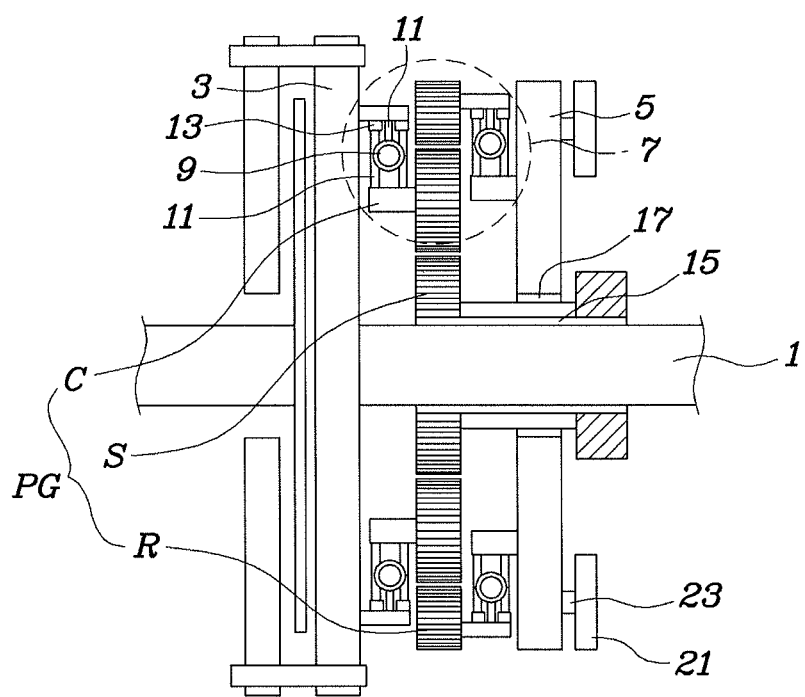
FIG. 5 is a view showing an exemplary apparatus for damping a flywheel according to the present invention.

That is, according to the illustrated embodiments of FIGS. 3 to 5, a carrier C of the planetary gearing PG is connected to the drive plate 3, a ring gear R is connected to the flywheel 5, and a sun gear S is fixed. Hence, power input into the carrier C is multiplied via the ring gear R, so that the flywheel 5 is rotated while its speed is increased by the power supplied through the drive plate 3, thus allowing an increased amount of inertial force to be provided to the crankshaft 1.

Figure 6:
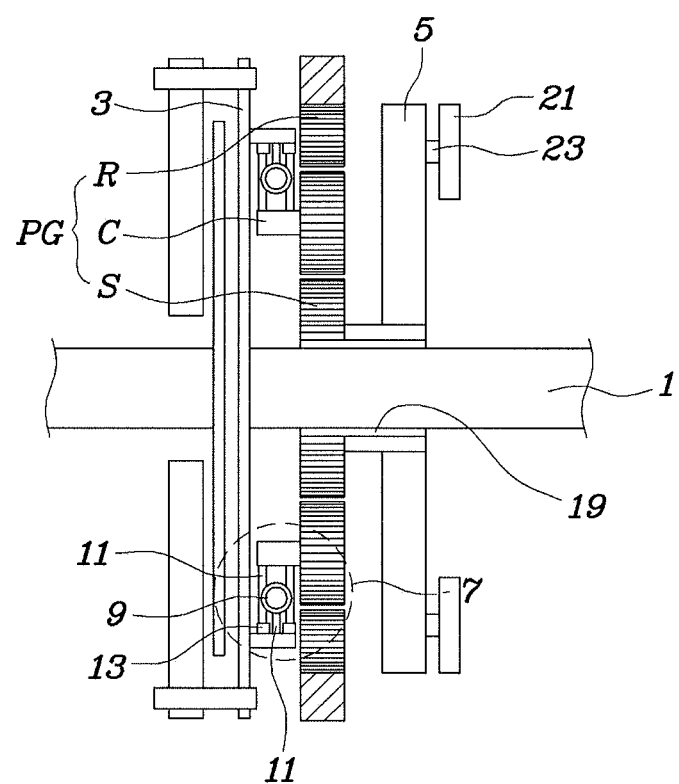
FIG. 6 is a view showing an exemplary apparatus for damping a flywheel according to the present invention.
Figure 7:
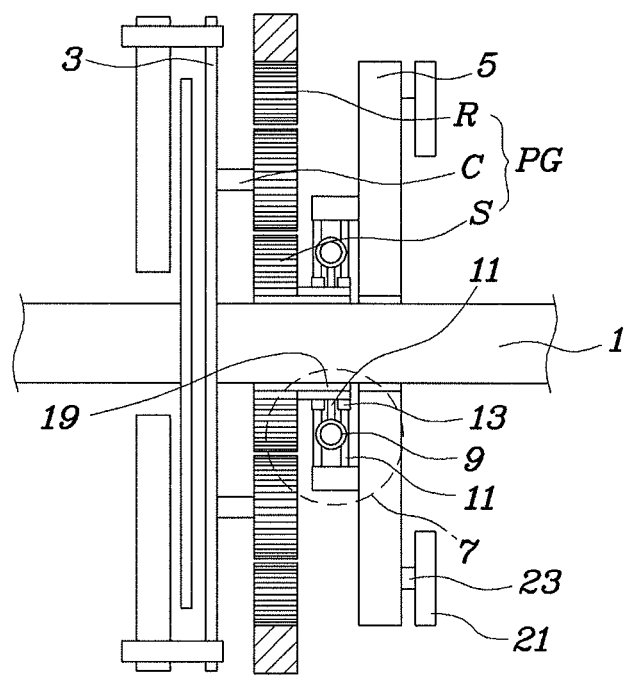
FIG. 7 is a view showing an exemplary apparatus for damping a flywheel according to the present invention.
Figure 8:
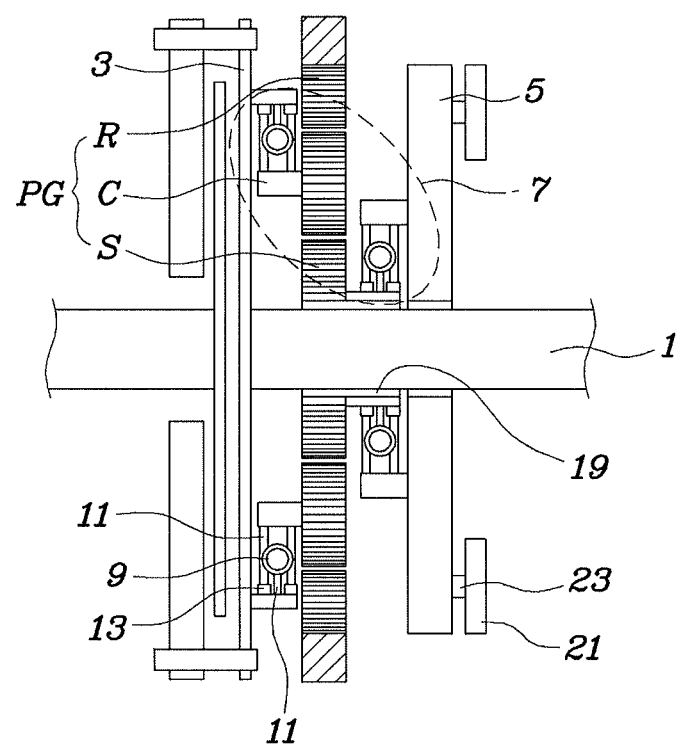
FIG. 8 is a view showing an exemplary apparatus for damping a flywheel according to the present invention.

Further, according to the illustrated embodiments of FIGS. 6 to 8, the carrier C of the planetary gearing PG is connected to the drive plate 3, the sun gear S is connected to the flywheel 5, and the ring gear R is fixed. Hence, power input into the carrier C is multiplied via the sun gear S, so that the flywheel 5 is rotated while its speed is increased by the power supplied through the drive plate 3, thus being capable of providing an increased amount of inertial force.

The rigidity imparting means 7 includes an elastic member 9 that is disposed, on the rotating-force transfer path between the drive plate 3 and the flywheel 5, in such a way as to elastically extend or contract with respect to relative rotation between two rotary bodies that are mounted so that they can rotate relative to each other.

That is, the rigidity imparting means 7 is disposed to cause two adjacent rotary bodies among rotary bodies on the rotating-force transfer path from the drive plate 3 to the flywheel 5 to rotate relative to each other, with the elastic member 9 interposed between the two rotary bodies.

Of course, the rigidity imparting means 7 may have support portions 11 on the two rotary bodies, respectively, to support both ends of the elastic member 9. In various embodiments such as those shown in FIGS. 3 to 8, the support portions 11, protruding radially inwards and outwards from the two corresponding rotary bodies, are configured to support both ends of a coil spring that functions as the elastic member 9.

Meanwhile, a guide bearing 13 is further provided between the two rotary bodies that are mounted to perform relative rotation while receiving an elastic force from the elastic member 9, and serves to guide the relative rotation between the two rotary bodies, thus allowing the smooth relative rotation between the two rotary bodies to be guided.

Here, the configuration of various embodiments such as those shown in FIGS. 3 to 8 will be described in detail. As shown in FIG. 3, the planetary gearing PG may be provided such that the carrier C is connected to the drive plate 3, the ring gear R is connected to the flywheel 5, and the rotation of the sun gear S is constrained. The rigidity imparting means 7 is provided between the drive plate 3 and the carrier C.

As shown in FIG. 4, the planetary gearing PG may be provided such that the carrier C is connected to the drive plate 3, the ring gear R is connected to the flywheel 5, and the rotation of the sun gear S is constrained. The rigidity imparting means 7 is provided between the ring gear R and the flywheel 5.

As shown in FIG. 5, the planetary gearing PG may be provided such that the carrier C is connected to the drive plate 3, the ring gear R is connected to the flywheel 5, and the rotation of the sun gear S is constrained. The rigidity imparting means 7 is provided, respectively, between the drive plate 3 and the carrier C and between the ring gear R and the flywheel 5.

As shown in FIG. 6, the planetary gearing PG may be provided such that the carrier C is connected to the drive plate 3, the sun gear S is connected to the flywheel 5, and the rotation of the ring gear S is constrained. The rigidity imparting means 7 is provided between the drive plate 3 and the carrier C.

As shown in FIG. 7, the planetary gearing PG may be provided such that the carrier C is connected to the drive plate 3, the sun gear S is connected to the flywheel 5, and the rotation of the ring gear S is constrained. The rigidity imparting means 7 is provided between the sun gear S and the flywheel 5.

As shown in FIG. 8, the planetary gearing PG may be provided such that the carrier C is connected to the drive plate 3, the sun gear S is connected to the flywheel 5, and the rotation of the ring gear S is constrained. The rigidity imparting means 7 is provided, respectively, between the drive plate 3 and the carrier C and between the sun gear R and the flywheel 5.

Referring to FIGS. 3 to 5, the sun gear S is mounted to an outer portion of the crankshaft 1 via a first support bearing 15, so that the sun gear S is stably secured to an engine block or the like while permitting relative rotation of the crankshaft 1. The flywheel 5 is supported to an outer portion of the sun gear S via a second support bearing 17, thus ensuring stable rotation.

Further, in FIGS. 6 to 8, in the state of the flywheel 5 being integrally connected to the outer portion of the sun gear S, an inner portion of the sun gear S is supported on the outer portion of the crankshaft 1 via a third support bearing 19. Such a configuration allows the sun gear S to rotate relative to the crankshaft 1, in addition to stably supporting the rotation.

Of course, a bushing ensuring proper lubrication may be substituted for each of the first support bearing 15, the second support bearing 17, the third support bearing 19 and the guide bearing 13.

Meanwhile, a pendulum hole H is formed in the mass body 21 and the flywheel 5 in such a way as to extend in a direction in which the mass body 21 performs relative rotation. A pendulum roller 23 is movably fitted into the pendulum hole H, so that the mass body 21 is coupled and rotates relative to the flywheel 5.

Figure 9:
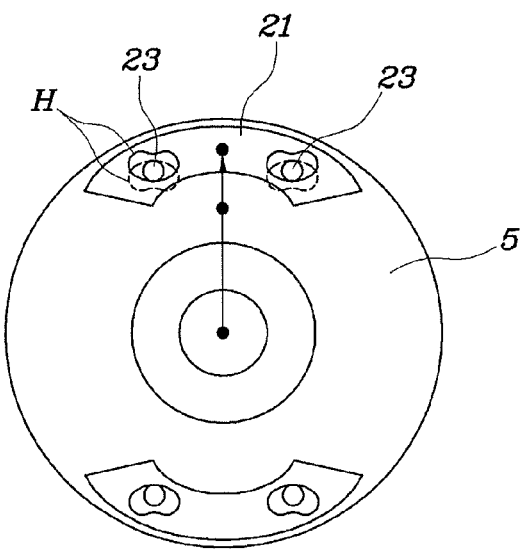
FIG. 9 is a view illustrating a principle of reducing torsional vibrations using a mass body in the damping apparatus of the present invention.
Figure 9:
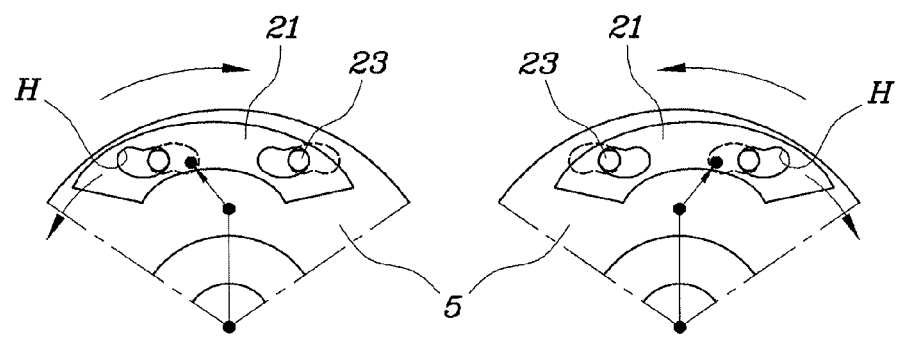

That is, as shown in FIG. 9, the pendulum hole H may be made in the flywheel 5 as well as the mass body 21. According to circumstances, the pendulum hole H may be formed in either of the mass body 21 or the flywheel 5. Here, in the case where the pendulum holes H are formed in both the mass body 21 and the flywheel 5, both ends of the pendulum roller 23 are fitted into the mass body 21 and the flywheel 5, respectively. Thus, the pendulum holes H should be formed at facing positions of a rotor 20 and the flywheel 5.

In this context, the pendulum hole H may be shaped into an approximate heart. In this case, the pendulum hole H of the mass body 21 and the pendulum hole H of the flywheel 5 may be formed at facing positions as described above in such a way that they have the shape of opposite hearts.

As described above, various embodiments have the following configurations in common: power is supplied from the engine crankshaft 1 through the drive plate 3 to the carrier C of the planetary gearing PG, and the sun gear S or the ring gear R is fixed to multiply the power, and the flywheel 5 is rotated at an increased speed, so that, for the same mass and volume, a much higher increase in the inertia can be provided to the crankshaft 1 and a power transmission system of the vehicle, in comparison with a flywheel 5 that is simply and directly connected to a crankshaft 1 according to the prior art.

Further, the rigidity imparting means 7 disposed on the power transfer path between the drive plate 3 and the flywheel 5 can provide rigidity suitable for the vehicle power transmission system including the engine and a gearbox in the above operation, thus greatly contributing to improve the NVH performance of the vehicle.

Moreover, in order to offset the torsional vibration transmitted from the engine along with rigidity provided from the flywheel 5 through the planetary gearing and the rigidity imparting means 7, the mass body 21 rotates relative to the flywheel 5.

That is, if the torsional vibration of the engine is transmitted to the flywheel 5, the mass body 21 moves as if it performed relative rotation in a direction opposite to the direction in which the momentary torsional vibration of the flywheel 5 is generated. Here, the pendulum roller 23 serves to guide the relative rotation of the mass body 21 in a section of the pendulum hole H as the mass body 21 performs the relative rotation, and a force is applied to momentarily pull the pendulum roller 23 in the direction of rotation of the mass body 21. Consequently, a momentary rotating force is applied to the rotor 20 in a direction opposite to the direction of rotation of the flywheel 5.

Therefore, a specific wave of the engine transmitted to the flywheel 5 is offset by a wave caused by the relative rotation of the mass body 21, thus further reducing the torsional rotational vibration. Further, the torsional vibration transmitted to the flywheel 5 is transmitted into the gearbox through the planetary gearing PG and the rigidity imparting means 7, thus absorbing or reducing the torsional vibration of the engine prior to being transmitted to the power transmission system of the vehicle.

The above embodiments of the present invention are adapted to optimally tune the inertia and rigidity of the vehicle power transmission system including the engine and the gearbox, using the planetary gearing PG and the rigidity imparting means 7 provided on the power transfer path thereof; thus allowing a vehicle drive state to be more silent and stable.

As described above, the present invention provides an apparatus for damping a flywheel, which occupies a relatively small volume and weight, allows the inertial force of the flywheel of an engine to be significantly increased, and enables the rigidity between a crankshaft and the flywheel to be adjusted, thus significantly improving the NVH performance of a drivetrain of a vehicle, in addition to reducing the rotational vibrations that occur in the engine, and thereby securing silent and stable drivability of the vehicle and a comfortable ride.

Furthermore, the present invention provides an apparatus for damping a flywheel, in which a specific wave of an engine transmitted to a flywheel is offset by a wave caused by relative rotation of a mass body, thus reducing torsional rotational vibrations, and thereby enabling the torsional vibrations of the engine to be effectively absorbed and reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for damping a flywheel, comprising:
a drive plate integrally connected to a crankshaft;
a flywheel configured to receive a rotating force from the drive plate through planetary gearing, the flywheel mounted to rotate relative to the crankshaft;
rigidity imparting means disposed on a path along which a rotating force is transferred between the drive plate and the flywheel; and
a mass body provided on the flywheel, the mass body configured to perform relative rotation in a direction that offsets a torsional vibration of an engine transmitted to the flywheel,
wherein the planetary gearing comprises three rotary elements including a first rotary element connected to the drive plate, a second rotary element connected to the flywheel, and a rotary element adapted to constrain rotation, so that the second rotary element connected to the flywheel is connected to increase a speed relative to the first rotary element connected to the drive plate, and
wherein the planetary gearing is provided with a carrier connected to the drive plate, a ring gear connected to the flywheel, wherein rotation of a sun gear is constrained, and
wherein the rigidity imparting means is provided between the ring gear and the flywheel.

2. The apparatus as set forth in claim 1, wherein the rigidity imparting means comprises:

an elastic member disposed to elastically extend or contract with respect to relative rotation between two rotary bodies that are mounted to rotate relative to each other.

3. The apparatus as set forth in claim 2, wherein the rigidity imparting means further comprises:
a support portion provided on each of the two rotary bodies to support both ends of the elastic member.

4. The apparatus as set forth in claim 2, further comprising:
a guide bearing receiving an elastic force from the elastic member, the guide bearing provided between the two rotary bodies that are mounted to rotate relative to each other to guide the relative rotation between the two rotary bodies.

5. The apparatus as set forth in claim 1, wherein
a pendulum hole is formed in the mass body and the flywheel to extend in a direction in which the mass body performs relative rotation, and
a pendulum roller is movably fitted into the pendulum hole, so that the mass body is coupled to rotate relative to the flywheel.

6. An apparatus for damping a flywheel, comprising:
a drive plate integrally connected to a crankshaft;
a flywheel configured to receive a rotating force from the drive plate through planetary gearing, the flywheel mounted to rotate relative to the crankshaft;
rigidity imparting means disposed on a path along which a rotating force is transferred between the drive plate and the flywheel; and
a mass body provided on the flywheel, the mass body configured to perform relative rotation in a direction that offsets a torsional vibration of an engine transmitted to the flywheel,
wherein the planetary gearing comprises three rotary elements including a first rotary element connected to the drive plate, a second rotary element connected to the flywheel, and a rotary element adapted to constrain rotation, so that the second rotary element connected to the flywheel is connected to increase a speed relative to the first rotary element connected to the drive plate, and
wherein
the planetary gearing is provided with a carrier connected to the drive plate, a ring gear connected to the flywheel, wherein rotation of a sun gear is constrained, and
the rigidity imparting means is provided, respectively, between the drive plate and the carrier and between the ring gear and the flywheel.

7. An apparatus for damping a flywheel, comprising:
a drive plate integrally connected to a crankshaft;
a flywheel configured to receive a rotating force from the drive plate through planetary gearing, the flywheel mounted to rotate relative to the crankshaft;
rigidity imparting means disposed on a path along which a rotating force is transferred between the drive plate and the flywheel; and
a mass body provided on the flywheel, the mass body configured to perform relative rotation in a direction that offsets a torsional vibration of an engine transmitted to the flywheel,
wherein the planetary gearing comprises three rotary elements including a first rotary element connected to the drive plate, a second rotary element connected to the flywheel, and a rotary element adapted to constrain rotation, so that the second rotary element connected to the flywheel is connected to increase a speed relative to the first rotary element connected to the drive plate, and
wherein the planetary gearing is provided with a carrier connected to the drive plate, a sun gear connected to the flywheel, wherein rotation of a ring gear is constrained, and the rigidity imparting means is provided between the drive plate and the carrier.

8. An apparatus for damping a flywheel, comprising:

a drive plate integrally connected to a crankshaft;

a flywheel configured to receive a rotating force from the drive plate through planetary gearing, the flywheel mounted to rotate relative to the crankshaft;

rigidity imparting means disposed on a path along which a rotating force is transferred between the drive plate and the flywheel; and a mass body provided on the flywheel, the mass body configured to perform relative rotation in a direction that offsets a torsional vibration of an engine transmitted to the flywheel, wherein the planetary gearing comprises three rotary elements including a first rotary element connected to the drive plate, a second rotary element connected to the flywheel, and a rotary element adapted to constrain rotation, so that the second rotary element connected to the flywheel is connected to increase a speed relative to the first rotary element connected to the drive plate, and wherein the planetary gearing is provided with a carrier connected to the drive plate, a sun gear connected to the flywheel, wherein rotation of a ring gear is constrained, and the rigidity imparting means is provided, respectively, between the drive plate and the carrier and between the sun gear and the flywheel.

* * * * *